United States Patent [19]

Winquist et al.

[11] Patent Number: 5,391,291
[45] Date of Patent: Feb. 21, 1995

[54] HYDROGENATION CATALYST AND PROCESS

[75] Inventors: Bruce H. C. Winquist; Brendan D. Murray, both of Houston; Stanley N. Milam, Spring; Robert C. Ryan, Houston, all of Tex.; Thomas W. Hastings, Barto, Pa.

[73] Assignee: Shell Oil Company, Houston, Tex.

[21] Appl. No.: 164,219

[22] Filed: Dec. 13, 1993

Related U.S. Application Data

[63] Continuation-in-part of Ser. No. 719,207, Jun. 21, 1991, abandoned.

[51] Int. Cl.[6] .............................................. C10G 23/04
[52] U.S. Cl. ...................................... 208/143; 208/142
[58] Field of Search ........................................ 208/143

[56] References Cited

U.S. PATENT DOCUMENTS

| | | | |
|---|---|---|---|
| 3,723,299 | 3/1973 | Seitzer | 208/143 |
| 3,730,877 | 12/1968 | Quik et al. | 208/143 |
| 3,730,878 | 5/1973 | Pollitzer | 208/143 |
| 3,751,515 | 8/1973 | Zadra | 208/143 |
| 3,929,672 | 12/1975 | Ward | 252/455 Z |
| 3,943,053 | 3/1976 | Kovach et al. | 208/143 |
| 4,401,556 | 8/1983 | Bezman et al. | 208/111 |
| 4,777,308 | 10/1988 | LaPierre et al. | 208/143 |
| 4,839,320 | 6/1989 | Trowbridge et al. | 502/66 |
| 4,894,142 | 1/1990 | Steigleder | 208/143 |
| 4,960,505 | 10/1990 | Minderhoud et al. | 208/143 |
| 5,030,780 | 7/1991 | Ward et al. | 208/143 |
| 5,057,206 | 10/1991 | Engel et al. | 208/143 |
| 5,147,526 | 9/1992 | Kukes et al. | 208/111 |
| 5,151,172 | 9/1992 | Kukes et al. | 208/143 |
| 5,308,814 | 5/1994 | Kukes et al. | 502/66 |

FOREIGN PATENT DOCUMENTS

| | | |
|---|---|---|
| 3818-A1 | 9/1979 | European Pat. Off. . |
| 247679-A2 | 12/1987 | European Pat. Off. . |
| 303332 | 8/1988 | European Pat. Off. ..... C10G 45/54 |
| 348001-A1 | 12/1989 | European Pat. Off. . |
| 366207-A1 | 5/1990 | European Pat. Off. . |
| 413138-A | 2/1991 | European Pat. Off. . |

OTHER PUBLICATIONS

Madon et al, "Beneficial Effects of Na in Fluid Cat Cracking Catalysts", Engelhardt Corporation, 8 May 1991.

Primary Examiner—Helane Myers

[57] ABSTRACT

The present invention relates to catalysts suitable for hydrogenating aromatics and olefins in hydrocarbon feedstocks boiling between about 125° C. and about 625° C. as well as the process for carrying out the hydrogenation. The catalysts consist of one or more Group VIII noble metal(s) on a support wherein the support is a Y-type zeolite prepared by contacting a starting Y-type zeolite having a unit cell size less than about 24.65, preferably less than about 24.4 angstroms, a silica to alumina molar ratio greater than about 5, preferably by greater than about 25 and an alkali metal content of less than about 0.30, preferably less than about 0.15 percent (basis metal) with one or more aqueous solution(s) comprising alkali(ne-earth) metal ions under conditions sufficient to provide a final alkali metal content (measured in terms of gram equivalent weight per gram of zeolite) of at least about 1.5 times greater than the alkali metal content (measured in terms of gram equivalent weight per gram of zeolite) of the starting zeolite. Preferred Group VIII metals are platinum and palladium and sodium is a preferred alkali(ne-earth) metal.

27 Claims, No Drawings

HYDROGENATION CATALYST AND PROCESS

This is a continuation-in-part of patent application Ser. No. 07/719,207, filed Jun. 21, 1991, now abandoned.

FIELD OF THE INVENTION

The present invention relates to a hydrogenation catalyst comprising one or more Group VIII metals, preferably platinum and/or palladium, supported on a modified zeolite Y. The invention further comprises the use of the catalyst for hydrogenating hydrocarbon feedstocks, particularly for hydrogenating the aromatics in such feedstocks to saturated compounds.

BACKGROUND OF THE INVENTION

The need for relatively non-aromatic liquid hydrocarbons boiling in the range of about 125° C. to about 625° C. (e.g., aviation turbine fuels, diesel fuels, flashed distillates, solvents, medicinal and other white oils) continues to increase. These products usually, or at least often, contain relatively high percentages of olefins and monocyclic and polycyclic aromatics so that further hydrogenation is desirable to produce higher valued products. The presence of aromatics in diesel fuels may contribute to air pollution. The hydrofinishing of these types of hydrocarbons to reduce unsaturates is becoming ever more important commercially.

Diesel fuels, which typically have a boiling range between about 200° C. to about 360° C., are under ever increasing environmental pressure to have their aromatics levels decreased. The presence of aromatics in diesel fuel can also significantly reduce the quality of the fuel. The accepted measure of diesel fuel quality is the Cetane Number ("C.N.") which is directly related to the types of molecules that are found in the fuel. Running a diesel engine on a lower cetane fuel than it was designed for will upset the combustion process due to a longer ignition delay period. This will result in poorer cold starting performance and higher levels of noise, smoke and legislated emissions. The cetane number of molecules within a class (e.g., normal paraffins) increases with the number of carbon atoms in the molecule. Molecular classes may be ranked in terms of their cetane number for a specific carbon number; normal paraffins have the highest cetane number followed by normal olefins, isoparaffins and lastly by monocyclic naphthenes. Aromatic molecules have the lowest cetane number. For example, naphthalene has a C.N. of about −15; tetrahydronaphthalene (tetralin) has a C.N. of about 7; decahydronaphthalene (decalin) has a C.N. of 48; butylcyclohexane has a C.N. of about 50; and decane has a C.N. of 76. Thus, a process which would saturate the aromatics in diesel fuel and also convert the resulting saturates to acyclics without significant hydrocracking would improve the quality of the diesel fuel with regard to environmental quality as well as efficiency.

The hydrogenation of unsaturated hydrocarbons, particularly aromatic hydrocarbons, to corresponding saturated hydrocarbons using a catalyst comprising platinum and/or palladium supported on alumina is disclosed in U.S. Pat. No. 3,943,053. An improvement over this catalyst can be found in European Patent Application no. 303,332, published Feb. 15, 1989, wherein as a support is utilized a Y-type of zeolite which has been modified to have a higher silica to alumina ratio and a smaller unit cell size than an unmodified zeolite Y. Similar modified Y-type zeolites are known to be used in hydrocracking operations. See, for example, U.S. Pat. No. 4,401,556, issued Aug. 30, 1983. The problem in utilizing the modified Y-type zeolite as in European No. 303,332, is that some hydrocracking activity is present which can hydrocrack the hydrocarbon feedstocks being hydrofinished, resulting in a reduced liquid yield.

A primary object of this invention is to provide a catalyst and process for hydrogenating petroleum fractions containing aromatics as well as olefins while concomitantly minimizing hydrocracking.

Another object of this invention is to provide a catalyst and process for hydrogenating the aromatics and olefins in diesel fuel stocks, converting the saturated aromatics at least in part to acyclic hydrocarbons while concomitantly minimizing hydrocracking thereby increasing the cetane number of the diesel fuel stock.

Another object of this invention is to provide a catalyst for the second stage of a low pressure two stage process wherein a sulfur- and nitrogen-containing diesel boiling range hydrocarbon feedstock is hydrotreated in the first stage, the product of the first stage is separated from the gaseous phase and passed to a second stage wherein it is hydrogenated to reduce the aromatics and olefins, producing additional acyclic hydrocarbons therefrom with minimum hydrocracking, resulting in a product with an increased cetane number.

SUMMARY OF THE INVENTION

The present invention relates to catalysts suitable for hydrogenating aromatics and olefins in hydrocarbon feedstocks boiling between about 125° C. and about 625° C. The instant catalysts comprise one or more Group VIII noble metal(s) on a support wherein the support comprises a Y-type zeolite and a binder and wherein the zeolite is prepared by contacting a starting Y-type zeolite having a unit cell size less than about 24.65, angstroms, preferably less than about 24.4 angstroms, a silica to alumina molar ratio greater than about 5, preferably greater than about 25, and an alkali metal, M, content of less than about 0.3, preferably less than about 0.15 percent by weight basis metal with one or more aqueous solution(s) comprising alkali(ne-earth) metal ions under conditions sufficient to provide a final alkali(ine-earth) metal content (measured in terms of gram equivalent weight per gram of zeolite) of at least about 1.5 times greater than the alkali metal content of the starting zeolite (measured in terms of gram equivalent weight per gram of zeolite). Preferably the Group VIII noble metal comprises platinum and/or palladium and most preferably comprises a combination of platinum and palladium. The instant invention also comprises the use of the instant catalysts to hydrofinish hydrocarbons boiling in the range of 125°–625° C., and particularly with contracted diesel range hydrocarbon boiling in the range of 125°–425° C., in order to saturate substantial portions of the aromatics and olefins.

DESCRIPTION OF THE PREFERRED EMBODIMENTS

The term "hydrocracking" as used herein refers to a reaction wherein a hydrocarbon molecule is broken at carbon-carbon bonds into two or more lower molecular weight hydrocarbon molecules with the concomitant addition of hydrogen to the molecules. Hydrocracking does not include the ring opening of a cyclic hydrocarbon molecule that is not accompanied by fragmentation into two or more molecules of lower molecular weight.

The term "alkali(ne-earth) metal" as used herein refers to a metal selected from the group consisting of alkali metal, alkaline earth metal and mixtures thereof, that is, it refers to alkali metal and/or alkaline earth metal and includes one or more alkali metals, one or more alkaline earth metals and two or more of a mixture of alkali metal(s) and alkaline earth metal(s). The term "ion" refers to an electrically charged moiety. It is understood that ions do not exist in vacuo, but are found in combination with charge-balancing counter ions. The term "alkali metal" is used herein as a descriptor of the elements of Group IA of the Periodic Table of the Elements (Li, Na, K, Rb, Cs). The term "alkaline earth metal" is used herein as a descriptor of the elements of Group IIA of the Periodic Table of the Elements (Be, Mg, Ca, Sr, Ba). Alkali (ne-earth) metal herein does not refer to the element in the metallic or zero valent state, but rather is a shorthand use for the element in the positive valent state. The gram equivalent weight of alkali(ne-earth) metal per gram of catalyst is determined by dividing the weight of alkali (ne-earth) metal in a gram of catalyst by the atomic weight of the alkali(ne-earth) metal.

An important aspect of the instant invention is the use as supports of Y-type or Y zeolites having relatively low alkali metal contents, say less than about 0.3 preferably less than about 0.15 percent by weight basis metal and which have been ion exchanged to increase their alkali(ne-earth) metal content. "Y-type zeolites" are zeolites which have the same general crystal structure as zeolite Y but which have contracted unit cells when compared to zeolite Y. The Y-type zeolite is frequently referred to in the art as simply Y zeolite or zeolite Y. These zeolites having contracted unit cell sizes are also known as ultrastable or ultrastabilized Y zeolites or Y zeolites. Irrespective of the terminology applied in the art, the zeolites used to prepare the instant catalysts are zeolites having the general crystal structure of zeolite Y and which are specifically defined by their unit cell size, silica to alumina molar ratio and sodium content.

The zeolitic materials which can be used as starting materials to produce the supports used to prepare the catalysts of the present invention comprise readily available Y-type zeolites such as zeolite Y, ultra-stable zeolite Y and very ultra-stable zeolite Y which have been modified by using processes known in the art to produce the base materials having the required unit cell size dimension together with the required silica to alumina molar ratios and low sodium content. Such modifications of unit cell size and silica to alumina molar ratio also necessarily produce zeolites having low alkali metal contents. Suitable modification processes comprise ion-exchange techniques, say one or more ion exchange steps with ammonium compounds, followed by one or more calcination stages, optionally in the presence of steam. See for example U.S. Pat. No. 3,929,672, issued Dec. 30, 1975. Normally, Y-type zeolites already partially modified are subjected to a so-called de-alumination technique to reduce the amount of alumina present in the system. De-alumination techniques are described extensively in the art and comprise inter alia the use of acid extraction, the use of silicon halides or other suitable chemical treating agents, chelates as well as the use of chlorine or chlorine-containing gases at high temperatures. Good results have been obtained using materials which have been subjected to one or more acid-leaching procedures, but other techniques can be applied as well.

The starting zeolite should be an ultra stable Y zeolite having a unit cell size less than about 24.65, a silica to alumina molar ratio of greater than about 5 and a sodium content of less than about 0.3 percent by weight basis metal.

In a preferred embodiment the unit cell size of the starting zeolite should be less than about 24.4 angstroms, preferably less than about 24.35 angstroms and more preferable less than about 24.30 angstroms. More preferably the unit cell size will range between about 24.2 and 24.3 angstroms, and most preferably between about 24.22 and 24.28 angstroms. The silica to alumina molar ratio of the preferred zeolite should be greater than about 25, more preferably greater than about 35, even more preferably greater than about 50 and most preferably greater than about 60. The processes used to dealuminate zeolites to obtain the high silica to alumina molar ratios of the starting zeolites result in zeolites having alkali metal contents that are relatively low compared to zeolite Y. The alkali metal contents of the preferred starting zeolites are less than about 0.15, preferably less than about 0.075 and more preferably less than about 0.04 percent by weight of the zeolite basis the alkali metal. While the alkali metal can be any of the alkali metals from lithium through cesium, sodium is preferred with potassium being the second most preferred. The alkali metal may be a mixture of two or more different alkali metals. The commercial manufacture of zeolite Y normally results in a sodium-exchanged zeolite Y. Using exotic manufacturing conditions, Y zeolites containing alkaline earth metal ions could be prepared in which case the alkaline earth metals would be considered equivalent to alkali metal ions when the valence difference is considered.

The starting zeolites are contacted with one or more solutions, preferably aqueous solutions, comprising one or more alkali(ne-earth) metal ions. These solutions are prepared by dissolving one or more dissolvable alkali(ne-earth) metal salts in a suitable solvent. The alkali(ne-earth) metal salts that are suitable are any salts that can be dissolved in a suitable impregnating solution. Illustrative but non-limiting examples of suitable salts are alkali(ne-earth) metal bicarbonates, carbonates, chlorates, perchlorates, cyanides, hydroxides, iodates, nitrates, nitrites, sulfates, hydrogen sulfates, sulfites, dithionates, thiosulfates, alkoxides, carboxylates, sulfonates, halides and the like. Preferred salts for use when water is the solvent include the nitrates, halides, sulfates and lower carboxylates. The contact with the solution of alkali(ine-earth) metal ions can occur at any point in the catalyst manufacturing process. It can by applied to a catalyst article after Group VIII metals incorporation or to a catalyst precursor pellet prior to Group VIII metals incorporation or to the zeolite prior to being formed into a catalyst (precursor) pellet. Preferably it is applied to the zeolite simultaneously with the application of the catalytic metals.

The contact of the zeolite with the solution of alkali(ne-earth) metal ions encompasses ion exchange, impregnation and mixtures thereof. Ion exchange typically encompasses contacting the zeolite with one or more solutions of metal ions under conditions which allow ion exchange, followed by washing of the zeolite to remove un-exchanged ions. Impregnation encompasses contacting the zeolite with a solution of metals ions and not following with a washing step. Thus, un-exchanged ions will remain in the zeolite.

The zeolite is contacted with the solution of alkali (ne-earth) metal ions under conditions of temperature and time sufficient to cause an increase of alkali(ne-earth) metal in the final or processed zeolite of greater than about 1.5 times, preferably greater than about 2 times, more preferably greater than about 5 times the amount of alkali(ne-earth) metal originally present in the starting zeolite, when measured as gram equivalent weights of alkali(ne-earth) metal per gram of zeolite. For example, if the starting zeolite contained 0.05 percent by weight of sodium oxide, then contact with a sodium ion-containing solution to provide a sodium content greater than 1.5 times would require an increase to greater than 0.075 weight percent sodium oxide, greater than 2 times would require an increase to greater than 0.1 weight percent of sodium oxide, etc. Solution contact temperatures will typically range from about 10° C. to about 100° C. Times will be generally be in excess of about 0.1 hours. The processed zeolite will have an alkali(ne-earth)metal content ranging from about 0.00004 to about 0.0004 gram equivalent weights of metal per gram of catalyst. In a preferred embodiment wherein the alkali(ne-earth)metal is sodium, potassium or mixtures thereof, the processed zeolite will have an alkali metal content ranging from about 0.1 to about 0.8 weight percent, basis metal, for sodium, from about 0.2 to about 1.4 weight percent, basis metal, for potassium and about 0.1 to about 1.4 weight percent, basis metal, for the mixture.

In a preferred embodiment the zeolite is admixed with a binder material, such as alumina, silica, silica-alumina, aluminophosphates, silicoaluminophosphates, magnesia, titania, clays or zirconia, preferably alumina.

In general terms the catalysts of the instant invention are prepared by forming the zeolite, optionally with the binder, into particles, chunks, pieces, pellets, rings, spheres, wagon wheels, trilobes, tetralobes and the like of a size suitable for employment in a reactor. Pelleting and extruding, preferably the latter, are operations used to shape the particles. After shaping, the particles are usually calcined at temperatures ranging from about 300° C. to about 850° C. in order to convert the particles into a durable catalyst precursor pellet. Calcining times are usually in excess of about 0.1 hours and generally between about 0.1 and about 20 hours, although longer times can be used but may not be economically desirable. After calcining, the catalytic Group VIII metals are incorporated into the catalyst precursor.

The Group VIII noble metals to be used in the process according to the present invention comprise ruthenium, rhodium, palladium, osmium, iridium and platinum. Very good results have been obtained with platinum, palladium and with combinations of platinum and palladium. The use of catalysts containing both platinum and palladium is preferred since such catalysts allow relatively low hydrogenation temperatures and pressures.

The noble metals are suitably applied in amounts between 0.05 and 3% w, basis total catalyst. Preferably amounts are used in the range between 0.2 and 2% w. When platinum and palladium are used as the noble metals, a platinum/palladium molar ratio ranging from about 0.1 to about 1.0 is normally applied.

The catalysts according to the invention are suitably prepared by incorporating the desired amount of noble metal(s) into the appropriate zeolite, optionally together with a binder, by means of impregnation and/or ion-exchange techniques followed by drying, calcining and a reduction treatment, suitably with hydrogen-containing gas(es) to produce the noble metal(s) in the desired state.

The zeolite(/binder) is impregnated by spraying, dipping or otherwise applying the solution of the Group VIII metal salt(s) or compound(s) to the zeolite(/binder) to get the desired concentration, or alternatively the solution may be applied several times with optional drying and/or calcining between applications. Other methods of catalyst preparative techniques are also available, such as mulling one or more Group VIII metal salt(s) or compound(s) with water and a zeolite/binder mixture prior to extrusion. Suitable methods comprise impregnation of the appropriate zeolite(/binder) material with an aqueous solution of suitable Group VIII metal(s) salts. Suitable palladium salts include, for example, a palladium(II) halide, preferably palladium(II)chloride or palladium nitrate or the appropriate amine-complex such as tetraamine palladium nitrate. Suitable platinum compounds to be used include hexahaloplatinic acid, in particular hexachloroplatinic acid-optionally in the presence of hydrochloric acid or the appropriate platinum amine complexes, such as platinum amine hydroxide and tetraamine platinum nitrate.

After the impregnation, the catalyst is typically dried to remove the solvent for the Group VIII metal salt(s) or compound(s), usually water. Drying will typically range in temperature from about 25° C. to about 200° C. when water is used as a solvent. Drying may be carried out in air, under forced draft, under vacuum or by use of other traditional methods. When drying to remove water is carried out in an air oven, typically the drying temperature will range from about 100° C. to about 200° C. Drying is carried out for sufficient time to remove the solvent, typically between about 0.1 and about 100 hours. The drying step can be combined with the calcining step.

After drying, the catalyst typically is calcined. Calcining typically is carried out in a neutral or oxidizing atmosphere, such as nitrogen or air, respectively. Air is the preferred calcining atmosphere. Calcining temperatures will range from about 200° C. to about 850° C., preferably from about 250° C. to about 600° C. Times are not critical and typically will be in excess of about 0.1 hours and usually will range between from about 0.1 to about 20 hours.

The final step in the preparation of the catalyst comprises activating the catalyst by heating in a reducing atmosphere at a temperature ranging between about 150° C. and about 600° C., preferably at a temperature between about 200° C. and about 500° C. Times typically will be in excess of about 0.1 hours and usually range from about 0.1 to about 20 hours. The preferred atmosphere is hydrogen. The final activation may be carried out as one of the steps of the catalyst preparation per se, or may be carried out in situ in a chemical reactor. Since the instant catalysts are utilized for the reduction of organic compounds with hydrogen, the in situ activation is quite convenient and economical. The activation is preferably carried out at elevated pressure, say above about 30 bar and most preferably between about 30 to about 250 bar. As used herein the term "catalyst" refers to the Group VIII metals-containing zeolitic materials, optionally with binder, both before activation and after.

Depending on the sulphur and nitrogen levels of the feedstock(s) to be treated it may be advantageous to subject the feedstocks to one or more pretreatments to reduce the levels of sulphur and nitrogen accordingly. Although the catalysts to be used in the present process are much more sulphur and nitrogen tolerant than prior art catalysts, it will be clear that best results will be obtained using feedstocks containing rather limited amounts of sulphur and nitrogen. It has been found that feedstocks containing up to about 1200 parts per million by weight of sulphur and up to about 225 parts per million by weight of nitrogen can be processed adequately. Preferably feedstocks with up to about 500 parts per million by weight of sulphur and up to about 100 parts per million by weight of nitrogen are processed and most preferably feedstocks with up to about 100 parts per million by weight of sulphur and up to about 25 parts per million by weight of nitrogen are processed. The lower the operating pressure, the lower will be the amounts of sulfur and nitrogen in the feedstock that can be tolerated in the hydrogenation process. For example at the lower operating pressures of around 500 psi (35 bar) feedstocks with up to about 100 parts per million by weight of sulphur and up to about 25 parts per million by weight of nitrogen are suitable. At operating pressures of around 1500 psi (100 bar) feedstocks with up to about 500 parts per million by weight of sulphur and up to about 100 parts per million by weight of nitrogen are suitable. It will be appreciated that both sulphur and nitrogen present in the pre-treated feedstocks will be converted substantially under the prevailing hydrogenation conditions since they are present in rather minute concentrations, the major process being the hydrogenation of the remaining aromatic compounds present in the feedstocks.

In most cases a pretreatment will be applied to the feedstocks that will be processed over the instant catalysts. The pre-treatment which can be applied in the process according to the invention normally comprises a hydrotreatment. Hydrotreating processes are well known in the art. Normally Group VIB and/or Group VIII metal compounds on an amorphous carrier such as alumina or silica-alumina can be suitably applied. Examples of such metals comprise nickel, cobalt, tungsten and molybdenum. One typical commercial hydrotreating catalyst comprises nickel and molybdenum supported on an alumina carrier. The catalysts are preferably in sulfided form. Temperatures between about 200° C. and about 425° C. can be suitably applied.

The instant catalyst are utilized to hydrogenate aromatics and olefins in hydrocarbon feedstocks, particularly the diesel boiling range hydrocarbons. Such feedstocks typically have a boiling range from about 125° C. to about 625° C., that is substantially all, i.e., greater than abut 90 percent of weight of its components boil between about 125° C. and about 625° C. A preferred boiling range of feedstocks is from about 125° C. to about 425° C. The instant process is particularly suitable for hydrofinishing diesel fuels, kerosenes and/or cycle oils. Kerosenes which can be advantageously applied comprise straight run kerosenes having a boiling range between 130° C. and 275° C. as well as hydrotreated kerosenes. The process according to the present invention is in particular suitable for the hydrogenation of so-called cycle oils, normally obtained from catalytic cracking operations. Light cycle oils, medium cycle oils as well as heavy cycle oils and mixtures of various cycle oils can be processed advantageously using the process according to the present invention. The process is particularly applied to diesel fuels and flashed distillates with the goal of reducing their aromatics content below that required by environmental regulations. On-road diesel fuels with boiling ranges from 200° C. to 360° C. are particularly desired end product of the instant process.

The hydrogenation process according to the present invention is normally carried out at a temperature between about 150° C. and about 400° C., in particular between about 200° C. and about 400° C. and preferably between about 225° C. and about 375° C. It should be noted that the temperature to be applied is dependent on the nature of the feedstock to be hydrogenated. Typically a temperature will be chosen which allows a substantial hydrogenation of the hydrogenatable components in the feedstock, say at least about 60% by weight of the total amount of components to be hydrogenated. It is preferred to carry out the process under conditions which allow at least about 75% conversion by hydrogenation of the hydrogenatable components. By a proper choice of temperature and pressure more than about 90% by weight of the hydrogenatable components can be hydrogenated without causing substantial hydrocracking at the same time. It is preferred to carry out the hydrogenation at rather low temperatures which will reduce hydrocracking side reactions in any event. The amount of feedstock that is hydrocracked during the instant process should be below about 30% by weight, preferably below about 20% by weight and most preferably below about 10% by weight.

The hydrogen partial pressure to be applied ranges between about 20 and about 250 bar, in particular between about 30 and about 150 bar, preferably between about 35 and about 100 bar. Total pressures, which depend on the temperature of operation and the amount of hydrogen present, may run about 10–20% higher than the hydrogen partial pressure and sometimes as much as 50% or more. Liquid hourly space velocities ("LHSV") between about 0.1 and about 10 liters of feed per liter of catalyst per hour ("1/1/h") can be applied. Hydrogen/feedstock ratios (Nl/kg) between about 200 and about 2000 (1000 to 10,000 SCF/BBL) can be suitably applied, preferably between about 400 and about 1500 Nl/Kg (2000 to 7500 SCF/BBL).

The process according to the present invention may be carried out in any suitable equipment. A fixed bed reactor system wherein the feedstock is passed over one or more stationary beds of catalyst is preferred. The reactor effluent is passed to a separation zone where hydrogen-rich gas is separated off and suitably recycled to the reaction zone together with make-up hydrogen as needed.

The hydrogen source used can be made of pure hydrogen or of hydrogen-containing mixtures for instance the gases produced in catalytic reforming processes.

The catalysts of the instant invention are particularly suited for processing diesel range fuel stocks which contain olefins and aromatics in order to saturate the olefins and aromatics and convert the aromatics at least in part to acyclics thereby improving the environmental quality and cetane number of the feedstock and producing a diesel fuel having a boiling range between about 125° C. and about 425° C., preferably between about 200° C. and about 360° C.

A particular embodiment of the instant invention comprises a two stage process for the combined hydrotreating and hydrogenating of diesel boiling range feedstocks containing nitrogen- and sulfur-containing impurities as well as relative high amounts of aromatics along with olefins to produce a diesel boiling range fuel with low nitrogen- and sulfur-containing impurities and a high cetane number. The first stage comprises contacting the feedstock with hydrogen and a conventional hydrotreating catalyst at hydrotreating conditions. The first stage oil product is stripped of gases (hydrogen sulfide, ammonia, hydrogen and light hydrocarbons) and then mixed with fresh hydrogen and fed to the second stage which contains the catalyst of the instant invention. Product oils with very low aromatics levels may be obtained by this method. Because of the activity of the instant catalysts, the two stage process can be operated at relatively low pressures, say from about 35 to about 100 bar, preferably from about 35 to about 70 bar. Such low pressures can result in considerable savings in construction costs of the reactors and associated equipment.

A specific embodiment of the instant invention thus comprises a low pressure process for the combined hydrotreating and hydrogenation of hydrocarbon feedstocks containing nitrogen- and sulfur-containing impurities, aromatics and olefins and which feedstocks have a boiling range between about 125° C. and about 625° C. which process comprises:

(a) passing the feedstock to a first stage wherein said feedstock is contacted with hydrogen and a hydrotreating catalyst comprising a Group VIII metal selected from nickel, cobalt and mixtures thereof and a Group VIB metal selected from molybdenum, tungsten and mixtures thereof supported on a support, preferably alumina, at a temperature ranging from about 250° C. to about 400° C., (b) stripping gases from the product passing from the first stage to produce a liquid product, (c) passing said stripped liquid product to a second stage wherein said liquid product is contacted with hydrogen and a hydrogenating catalyst comprising platinum and palladium in an amount ranging from about 0.05 to about 3 percent by weight of the total catalyst and in a platinum to palladium molar ratio ranging from about 0.1 to about 1.0 supported on a support wherein the support comprises a Y-type zeolite and an alumina binder and wherein the zeolite is prepared by contacting a starting Y-type zeolite having a unit cell size of less than about 24.65, preferably less than about 24.4 angstroms, a silica to alumina molar ratio greater than about 5, preferably greater than about 25, and an alkali metal content of less than about 0.3, preferably less than about 0.15 percent (basis metal) with one or more aqueous solution(s) comprising alkali(ne-earth) metal ions under conditions sufficient to provide a final alkali(ne-earth) metal content (measured in terms of gram equivalent weight per gram of zeolite) of at least about 1.5 times greater than the alkali metal content (measured in terms of gram equivalent weight per gram of zeolite) of the starting zeolite, and (d) stripping gases from the product passing from the second stage to produce a final liquid product.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The present invention will now be illustrated by means of the following Examples which are provided for illustrative purposes only and are not to be construed as limiting the invention.

Catalyst Preparation

The following illustrative embodiments describe the typical preparation of zeolites and the resulting catalysts of the instant invention.

Illustrative Embodiment A-1

Catalyst A-1

A starting dealuminated Y-type zeolite having a molar silica to alumina ratio of 63, a sodium content (basis metal) of 0.04 weight percent and a unit cell size of 24.25 angstroms was used to prepare this catalyst.

The above zeolite was ion exchanged in an 8.1 weight percent solution of sodium nitrate at 82° C. for 1 hour and then washed with de-ionized water. The resultant material was dried at 116° C. for 16 hours to produce the zeolite product used to prepare the catalyst. The product had a sodium content (basis metal) of 0.31 weight percent and a surface area of 810 $m^2/g$. This dried material was mulled with 20 percent by weight (dry basis) of pseudoboehmite powder (Vista Catapal B Alumina) in the presence of about 1.5 percent by weight acetic acid and sufficient water to make an extrudable mass. The extrudate was dried at 125° C. and calcined at 550° C. for 2 hours. The calcined extrudate was contacted with an aqueous solution of tetra amine platinum nitrate and tetra amine palladium nitrate (at a pH of 5.3) in concentrations sufficient to provide a final catalyst having 0.3 percent by weight of platinum, basis total catalyst weight, and 0.5 percent by weight of palladium, basis total catalyst weight. The resultant material was dried at 125° C. and calcined at 300° C. for 2 hours. The final sodium content was 0.31 wt %.

Comparative Catalyst CA-1

Catalyst CA-1 was prepared in the same manner as Catalyst A-1 with the exception that the ion exchange step with the sodium nitrate was omitted. The final sodium content was 0.04 wt %.

Comparative Catalyst CA-2

Catalyst CA-2 was prepared in the same manner as Catalyst A-1 with the exception that the ion exchange step with the sodium nitrate was omitted and the starting dealuminated Y-type zeolite was washed less extensively than the Y-type zeolite used to prepare Catalyst CA-1 so that the sodium content was brought down to only 0.19 wt % rather than 0.04 wt % as in Catalyst CA-1.

Comparative Catalyst CA-3

Catalyst CA-3 was prepared in the same manner as Catalyst A-1 with the exception that the ion exchange step with the sodium nitrate was omitted and the starting dealuminated Y-type zeolite was washed less extensively than the Y-type zeolite used to prepare Catalyst CA-2 so that the sodium content was brought down to only 0.31 wt % rather than 0.04 wt % as in Catalyst CA-1.

Comparative Catalyst CA-4

Catalyst CA-4 was prepared in the same manner as Catalyst A-1 with the exception that the catalyst was prepared utilizing an alumina support (Criterion KC-300, available commercially from Criterion Catalyst Co. LP). The final sodium content was 0.31 wt %.

Illustrative Embodiments B-1 through B-6

Catalysts B-1 through B-6

A starting Y-type zeolite having a molar silica to alumina ration of 83, a sodium content (basis metal) of 0.02 weight percent, a unit cell size of 24.26 and a surface area of 760 m$^2$/g was used to prepare these catalysts.

The above zeolite was mulled with 20 percent by weight (dry basis) of pseudoboehmite powder (Vista Catapal B Alumina) in the presence of about 1.5 percent by weight acetic acid and sufficient water to make an extrudable mass. The extrudate was dried at 125° C. and calcined at 550° C. for 2 hours. The calcined extrudate was impregnated with an aqueous solution of tetra amine platinum nitrate, tetra amine palladium nitrate and sodium nitrate (at a pH of 5.3) in concentrations sufficient to provide a final catalyst having 0.3 percent by weight of platinum, basis total catalyst weight, 0.5 percent by weight of palladium, basis total catalyst weight and the varying weights of sodium indicated in the table below. The resultant material was dried at 125° C. and calcined at 300° C. for 2 hours.

| Catalyst | Sodium Content, % wt metal |
| --- | --- |
| B-1 | 0.17 |
| B-2 | 0.34 |
| B-3 | 0.50 |
| B-4 | 0.83 |
| B-5 | 1.67 |
| B-6 | 3.33 |

Comparative Catalyst CB-1

The above example was repeated except sodium nitrate was omitted from the impregnation step.

Illustrative Embodiments C-1 through C-2

Catalysts C-1 through C-2

A starting Y-type zeolite having a molar silica to alumina ratio of 82, a sodium content (basis metal) 0.02 weight percent, a unit cell size of 24.26 angstroms and a surface area of 768 m$^2$/g was used to prepare these catalysts.

The above zeolite was ion exchanged with an 1.0 N solution of calcium nitrate, (C-1), or an 1.0 N solution of magnesium nitrate, (C-2), at 93° C. for three hours. The zeolites were filtered and washed with de-ionized water and then dried at 116° C. for 16 hours to produce zeolite products suitable for preparing catalysts. The resultant products both had surface areas of 741 m$^2$/g and CaO or MgO contents of 0.14 weight percent (anhydrous). The dried zeolite powders were then mulled with 20 percent by weight (dry basis) of pseudoboehmite powder (Vista Catapal B Alumina) in the presence of about 1.5 percent by weight acetic acid and sufficient water to make an extrudable mass. The extrudate was dried at 125° C. and calcined at 550° C. for 3 hours. The calcined extrudate was contacted with an aqueous solution of tetra amine platinum nitrate and tetra amine palladium nitrate (at a pH of 5.3) in concentrations sufficient to provide a final catalyst having 0.3 percent by weight of platinum, basis total catalyst weight, and 0.5 percent by weight of palladium, basis total catalyst weight. The resultant material was dried at 125° C. and calcined at 300° C. for 2 hours.

| Catalyst | Alkali (ne-earth) Metal Oxide Content, % wt |
| --- | --- |
| C-1 | 0.14 (CaO) |
| C-2 | 0.14 (MgO) |

Illustrative Embodiments D-1 through D-6

Catalysts D-1 through D-6

A starting Y-type zeolite having a molar silica to alumina ratio of 83, a sodium content (basis metal) of 0.02 weight percent, a unit cell size of 24.26 and a surface area of 760 m$^2$/g was used to prepare these catalysts.

The above zeolite was mulled with 20 percent by weight (dry basis) of pseudoboehmite powder (Vista Catapal B Alumina) in the presence of about 1.5 percent by weight acetic acid and sufficient water to make an extrudable mass. The extrudate was dried at 125° C. and calcined at 550° C. for 2 hours. The calcined extrudate was contacted with an aqueous solution of tetra amine platinum nitrate, tetra amine palladium nitrate and an alkali(ne-earth) metal nitrate in concentrations (at a pH of 5.3) sufficient to provide a final catalyst having 0.3 percent by weight of platinum, basis total catalyst weight, 0.5 percent by weight of palladium, basis total catalyst weight and the varying weights of alkali(ne-earth) metal indicated in the table below. The resultant material was dried at 125° C. and calcined at 300° C. for 2 hours.

| Catalyst | Alkali (ne-earth) Content, % wt metal |
| --- | --- |
| D-1 | 0.31 (Li) |
| D-2 | 0.31 (K) |
| D-3 | 0.46 (Cs) |
| D-4 | 0.42 (Ca) |
| D-5 | 0.25 (Ca) |
| D-6 | 0.20 (Ba) |

Catalysts E-1 through E-3

A Y zeolite having a unit cell size of 24.57 angstroms, a silica to alumina molar ratio of 7.3, a sodium content of 0.15, basis metal, and a surface area of 800 m$^2$/g was used as the starting zeolite. This starting zeolite was mulled with 20 percent by weight of alumina, extruded into pellets and calcined.

Sodium nitrate in the amount shown below was dissolved in 500 milliliters of deionized water. To this solution were added 100 grams of the zeolite/alumina pellets and the mixture was stirred at the temperature listed below for 24 hours.

| Catalyst | NaNO$^3$ Conc. (M) | Temp., °C. |
| --- | --- | --- |
| E-1 | 0.25 | 25 |
| E-2 | 1.00 | 25 |
| E-3 | 2.00 | 100 |

Catalysts E-1 and E-2 were then filtered and washed with 1 liter of deionized water. Catalyst E-3 was re-exchanged with fresh NaNO3 and heated for another 16 hours before washing with 4×100 milliliters of deionized water. All catalysts were dried at 110° C. and catalyst E-3 was calcined at 500° C. for 2 hours. The water pore volume of the catalysts were determined and then the catalysts were pore volume impregnated with the appropriate amounts of Pd (NH3)4(NO3)2 and Pt (NH3)4(NO3)2 dissolved in deionized water, adjusted to a pH of 5.3. All catalysts were then dried overnight at 110° C. and calcined at 300° C. The final properties are summarized below.

| Catalyst | Metal Loading, % wt | | |
|---|---|---|---|
|  | Pt | Pd | Na |
| E-1 | 0.35 | 0.53 | 0.4 |
| E-2 | 0.33 | 0.50 | 1.6 |
| E-3 | 0.33 | 0.55 | 2.2 |

Hydrogenation Process

Illustrative Embodiment P-1

The following illustrative embodiment describes the process using catalysts of the instant invention and comparative catalysts, prepared as described above, to hydrofinish two diesel feedstocks.

A stainless steel vertical tube reactor was used with gas flow entering from the top. The reactor was packed from top to bottom as follows: a layer of glass wool, a layer of 20–30 mesh silicon carbide, 18.75 grams of the catalyst admixed with 70 grams of 60–80 mesh silicon carbide, a layer of 20–30 mesh silicon carbide and a layer of glass wool. Two feedstocks were used in the testing. The physical properties of the first feedstock tested, 88-50C, are listed in Table 1. The physical properties of the second feedstock, 90-45, are described in Table 4. This feedstock had higher nitrogen, sulfur and aromatics content than the first feedstock. The test protocols for these two feedstocks are outlined in Tables 2 and 5. Liquid and gas products were analyzed by GC and the aromatic contents of the liquid products were determined by NMR and GC-MS. Performance results for feedstocks 88-50C and 90-45 are shown in Tables 3 and 6, respectively.

TABLE 1

| Properties of Feedstock 88-50C | |
|---|---|
| Spec. Gravity: | 0.8794 g/cc at 16° C. |
| % Wt. Hydrogen: | 12.61 |
| % Wt. Carbon: | 87.32 |
| % Wt. Oxygen: | 0.024 |
| Sulfur: | 440 ppm |
| Nitrogen: | 2 ppm |
| Aromatics: | 34.2% vol. (GC-MS) |
| 13.3% Aromatic Carbon (UV) | |
| 15.9% Aromatic Carbon (NMR) | |
| TBP-GC (°C.) | IBP 171 |
| | 5% 224 |
| | 10% 237 |
| | 30% 263 |
| | 50% 285 |
| | 70% 310 |
| | 90% 384 |
| | FBP 419 |

TABLE 2

| Test Protocol for Feedstock 88-50C | |
|---|---|
| A. Feedstock: | Table 1 |
| Unit Pressure: | 725 psig |
| Temperature (°C.): | 320, 300, 290 |
| LHSV, (hr−1): | 1.25, (except as otherwise noted) |
| Hydrogen to Oil: | 5000 scf H2/bbl |
| Catalyst Wt.: | 18.75 g |
| B. Day 1: | The catalyst is loaded into the reactor, the hydrogen flow is started and the pressure is raised to 50 bar while the |

TABLE 2-continued

| Test Protocol for Feedstock 88-50C | |
|---|---|
| | reactor is heated to 400° C. at a ramp rate of 55° C./hr. The catalyst is reduced for 8 hours at 400° C. and then the reactor is cooled to 320° C. at which point the feedstock is cut in. |
| Days 2–8: | Unit line-out. |
| Day 9: | Balance period started at 320° C. |
| Day 10: | Balance period started at 300° C. |
| Day 11: | Balance period started at 290° C. |
| Day 12: | Shut off feed, strip catalyst and cool reactor. |

TABLE 3

| Performance Results on Feedstock 88-50C | | | | |
|---|---|---|---|---|
| | % Arom. Conv | | 204° C. + Yield, % wt | |
| Catalyst | @290° C. | @320° C. | @290° C. | @320° C. |
| A-1 | 55* | 70* | 96.3 | 91.5 |
| CA-1 | 56* | 75* | 88.8 | 55.4 |
| B-1 | 76 | 90 | 92.9 | 70.4 |
| B-2 | 73 | 86 | 93.5 | 80.1 |
| B-3 | 69 | 83 | 94.8 | 85.2 |
| B-4 | 44 | 60 | 95.3 | 91.6 |
| B-5 | 20 | 26 | 97.0 | 96.4 |
| B-6 | 6 | 8 | 97.5 | 97.5 |
| CB-1 | 71 | 89 | 91.1 | 59.6 |
| C-1 | 73 | 90 | 92.1 | 71.8 |
| D-3 | 68 | 84 | 92.6 | 64.3 |
| CA-2 | 46* | 66* | 89.7 | 54.0 |
| CA-3 | 44* | 66* | 87.4 | 46.3 |
| CA-4 | 29* | 38* | 98.6 | 98.6 |

*Aromatics conversion measured at 1.4 LHSV.

It can be seen from the data in Table 3 that at substantially comparable conversions a significant increase in the yield is obtained using the alkali(ne-earth) metal enhanced zeolites, A-1, B-1-B-3 and C-1, when compared to the non-enhanced zeolites of catalysts CA-1, CA-2, CA-3 and CB-1. The catalyst A-1, CA-3 and CA-4 all possessed equal sodium contents. The alumina based catalyst CA-4 exhibited very low aromatics conversion compared to the zeolitic catalyst A-1 prepared by the present invention. The higher aromatics conversion and yields obtained with catalyst A-1 compared to catalyst CA-3 illustrates the method by which the sodium level is obtained is critical.

TABLE 4

| Properties of Feedstock 90-45 | |
|---|---|
| Spec. Gravity: | 0.8916 g/cc at 16° C. |
| % Wt. Hydrogen: | 12.27 |
| % Wt. Carbon: | 87.63 |
| % Wt. Oxygen: | 0.03 |
| Sulfur: | 640 ppm |
| Nitrogen: | 25 ppm |
| Aromatics: | 38.1% vol. (GC-MS) |
| 16.0% Aromatic Carbon (UV) | |
| 25.2% Aromatic Carbon (NMR) | |
| TBP-GC (°C.) | IBP 149 |
| | 5% 208 |
| | 10% 223 |
| | 30% 260 |
| | 50% 288 |
| | 70% 316 |
| | 90% 358 |
| | FBP 416 |

TABLE 5

| Test Protocol for Feedstock 90-45 | |
|---|---|
| A. Feedstock: | Table 1 |
| Unit Pressure: | 700 psig |
| Temperature (°C.): | 329, 316, 302 |

TABLE 5-continued

Test Protocol for Feedstock 90-45

| | |
|---|---|
| LHSV, WHSV (hr−1): | 1.00, 1.62 (except as otherwise noted) |
| Hydrogen to Oil: | 5000 scf H$_2$/bbl |
| Catalyst Wt.: | 18.75 g |
| B. Day 1: | The catalyst is loaded into the reactor, the hydrogen flow is started and the pressure is raised to 50 bar while the reactor is heated to 400° C. at a ramp rate of 55° C./hr. The catalyst is reduced for 8 hours at 400° C. and then the reactor is cooled to 320° C. at which point the feedstock is cut in. |
| Days 2–8: | Unit line-out. |
| Day 9: | Balance period started at 316° C. |
| Day 10: | Balance period started at 302° C. |
| Day 11: | Balance period started at 329° C. |
| Day 12: | Shut off feed, strip catalyst and cool reactor. |

TABLE 6

Performance Results on Feedstock 90-45

| | % Arom. Conv | | 204° C. + Yield, % wt | |
|---|---|---|---|---|
| Catalyst | @302° C. | @316° C. | @302° C. | @316° C. |
| B-2 | 54 | 66 | 92.3 | 90.3 |
| CB-1 | 51 | 66 | 90.7 | 84.7 |
| D-1 | 29 | 40 | 93.2 | 92.1 |
| D-2 | 55 | 67 | 90.9 | 87.5 |
| D-4 | 53 | 65 | 92.0 | 88.4 |
| D-6 | 55 | 67 | 89.5 | 84.5 |

Illustrative Embodiment P-2

Catalysts E-1, E-2, E-3 and a catalyst prepared as described above for B-2 were tested in a vertical tubular reactor (down flow) using Feedstock 90-45 (See Table 4 for properties). The test protocol is outlined in Table 7. The liquid and gas products were analyzed by GC. The aromatics contents of the liquid products were determined by NMR and GC-MS. The results are tabulated in Table 8.

TABLE 7

Test Conditions and Procedure

| Conditions | |
|---|---|
| Feedstock | WRC 90-45 |
| Unit Pressure (psig) | 700 |
| Temperature (°C.) | 316, 302, 329 |
| LHSV (hr−1) | 1.00 |
| H$_2$ Circulation (SCF/BBL) | 5000 |
| Catalyst Weight (gm) | 24.76 |
| Catalyst Volume (cc) | 40 |
| Procedure | |
| Day 1: | Catalyst is mixed with 70 gm silicon carbide and loaded in the reactor. Hydrogen flow is started and the pressure is raised to 50 bar while the reactor is heated to 400° C. at a rate of 55° C./hr. The catalyst is reduced for 8 hours at 400° C. and then the reactor is cooled to 316° C. and the feed is cut in. |
| Day 2–8: | Unit line-out. |
| Day 9: | Balance period at 316° C. |
| Day 10: | Line-out at 302° C. |
| Day 11: | Balance period at 302° C. |
| Day 12: | Line-out at 329° C. |
| Day 13: | Balance period at 329° C. |

TABLE 8

Catalysts Performance

| | | | | | Temperature (°C.) | | |
|---|---|---|---|---|---|---|---|
| | Zeolite | % Arom. Conv. | | | 204 + °C. Yield (% wt) | | |
| Catalyst | Na (% wt) | 302 | 316 | 329 | 302 | 316 | 329 |
| B-2 | 0.34 | 59 | 69 | 70 | 92.3 | 90.3 | 87.8 |

TABLE 8-continued

Catalysts Performance

| | | | | | Temperature (°C.) | | |
|---|---|---|---|---|---|---|---|
| | Zeolite | % Arom. Conv. | | | 204 + °C. Yield (% wt) | | |
| Catalyst | Na (% wt) | 302 | 316 | 329 | 302 | 316 | 329 |
| E-1 | 0.4 | 43 | 57 | 58 | 86.5 | 75.7 | 61.0 |
| E-2 | 1.6 | 26 | 47 | 44 | 93.1 | 89.7 | 84.3 |
| E-3 | 2.2 | 24 | 40 | 39 | 92.5 | 89.7 | 87.4 |

Illustrative Embodiment P-3

The following illustrative embodiment describe the process using catalyst B-2 described above to hydro finish a 100% coker light gas oil (Feed 90-21) whose properties are shown in Table 9. It also illustrates the use of the instant hydrogenation process with a conventional hydrotreating process to provide a low pressure two stage process.

A commercial alumina supported nickel molybdenum catalyst was used as a hydrotreating catalyst. The feed stock was hydrotreated at 360° C., 650 psig total unit pressure, LHSV of 0.4 hr$^{-1}$ and a hydrogen flow rate of 2000 SCF/BBL. After hydrotreatment the hydrotreated feed had the properties shown in Table 9.

The hydrotreated feed and hydrogen were passed over catalyst B-2 of the instant invention at 300° C., 650 psig total unit pressure, LHSV of 1.0 hr$^{-1}$ and a hydrogen flow rate of 5000 SCF/BBL. The final product ("saturated product") had the properties listed in Table 9.

Table 9 illustrates that the saturated product contained very low level of aromatics. The two stage process also resulted in a dramatic improvement in the cetane number. For this feed stock, hydrotreating led to a 22% increase in the cetane number (from 36 to 44) and saturation led to a further increase of 19% in the cetane number to 51.

TABLE 9

Properties of Feed 90-21, Hydrotreated Product and Saturated Product

| | Feed | Hydrotreated Product | Saturated Product |
|---|---|---|---|
| % H | 12.20 | 13.45 | 14.39 |
| % C | 85.67 | 86.58 | 85.60 |
| ppm S | 14200 | 40 | 1 |
| ppm N | 1880 | 1 | 1 |
| FIA (D-1319) (ASTM) | | | |
| Saturates | 45.5 | 74.6 | 98.9 |
| Olefins | 12.2 | 0.0 | 0.0 |
| Aromatics | 42.2 | 25.4 | 1.1 |
| Simulated Distillation D-2887 (ASTM) | | | |
| IBP | 104° C. | 97° C. | 53° C. |
| 5% | 172° C. | 155° C. | 114° C. |
| 10% | 200° C. | 179° C. | 139° C. |
| 30% | 231° C. | 219° C. | 197° C. |
| 50% | 254° C. | 240° C. | 219° C. |
| 70% | 275° C. | 264° C. | 243° C. |
| 90% | 304° C. | 298° C. | 278° C. |
| 95% | 316° C. | 311° C. | 294° C. |
| FP | 359° C. | 355° C. | 327° C. |
| Cetane No. D-613 (ASTM) | 36 | 44 | 51 |

Feed 90-21, the hydrotreated product and the saturated product were analyzed by GC-MS in order to determine the ring content. These results are shown in Table 10 below. The results clearly show that the instant process is effective at ring opening to produce higher cetane number product.

TABLE 10

Distribution of Ring Numbers for Feed 90-21. Hydrotreated Product and Saturated Products

|  | Feed | Hydrotreated Product | Saturated Product |
|---|---|---|---|
| 1 ring | 28.28 | 32.95 | 34.97 |
| 2 rings | 35.35 | 32.21 | 30.06 |
| 3 rings | 9.74 | .8.20 | 4.78 |
| 4 rings | 0.97 | 0.23 | 0.05 |
| Alicyclic-Saturates | 25.67 | 26.41 | 30.14 |
|  | 100.01 | 100.00 | 100.00 |

Illustrative Embodiment P-4

The following illustrative embodiment describes the process using catalyst B-2 described above to hydrofinish a feedstock (90-83) having a very high final boiling point. It also illustrates the use of the instant hydrogenation process with a conventional hydrotreating process to provide a two stage process. A commercial hydrotreating catalyst, alumina supported nickel/molybdenum, was sulfided and used. The feedstock was a blend of 66% wt diesel and 33% wt heavy flashed distillate and had the properties listed in the table below. The feedstock was hydrotreated with the sulfided Ni/Mo catalyst at 385° C. and 1500 psig total pressure with a hydrogen rate of 2000 SCF/BBL and LHSV of 0.5 hr⁻¹. The hydrotreated feed had the properties listed in the table below.

TABLE 11

Properties of Feedstock 90-83 Before and After Hydrotreating

|  | Feedstock Properties | Hydrotreated Feed Properties |
|---|---|---|
| S & N Content | | |
| ppmw S | 640 | 15 |
| ppmw N | 1340 | 108 |
| Specific Gravity, (16° C.) | 0.9053 g/cc | 0.8795 g/cc |
| % wt Hydrogen | 12.178 | 12.92 |
| % wt Carbon | 87.592 | 87.16 |
| Aromatics | | |
| NMR | 19.83% | 10.5 |
| UV | 15.91% | 8.2 |
| Distillation | | |
| IBP | 224° C. | 216° C. |
| 10% | 265° C. | 254° C. |
| 20% | 280° C. | 274° C. |
| 30% | 298° C. | 292° C. |
| 40% | 316° C. | 311° C. |
| 50% | 342° C. | 331° C. |
| 60% | 370° C. | 359° C. |
| 70% | 435° C. | 408° C. |
| 80% | 512° C. | 493° C. |
| 90% | 549° C. | 541° C. |
| 99% | 596° C. | 583° C. |

The hydrotreated feed and hydrogen were passed over catalyst B-2 of the instant invention under the conditions listed in the table below for four separate runs yielding products 1, 2, 3 and 4 with the properties listed in the table below. Product 5 was produced by substituting B-2 with a commercially available sulfided nickel/molybdenum on alumina catalyst.

TABLE 12

Properties of Saturated Product

|  | Product 1 | Product 2 | Product 3 | Product 4 | Product 5 |
|---|---|---|---|---|---|
| Operating Conditions | | | | | |
| $H_2$ Rate, SCF/BBL | 3300 | 5500 | 5000 | 5800 | 5400 |
| LHSV, hr−1 | 1.5 | 0.9 | 1.0 | 0.8 | 0.9 |
| Total Press., psig | 700 | 700 | 1200 | 1500 | 700 |
| Temp., °C. | 343 | 343 | 343 | 343 | 343 |
| S & N Content | | | | | |
| ppmw S | 16 | 13 | 4 | 3 | 5 |
| ppmw N | 44 | 35 | 29 | 24 | 65 |
| Aromatics | | | | | |
| NMR | 6.4 | 5.5 | 2.2 | 1.6 | 10.4 |
| UV | 4.9 | 4.6 | 1.7 | 1.1 | 8.5 |

Products 2 and 5 were obtained under essentially the same conditions, but it can be seen that the use of the instant catalyst results in a significant decrease in the aromatics content of the final product.

What is claimed is:

1. A process for the hydrogenation of hydrocarbon feedstocks containing hydrogenatable components and which have a boiling range between about 125° C. and about 625° C. which process comprises contacting said feedstock at a temperature ranging between about 150° C. and about 400° C. with hydrogen and a catalyst comprising one or more Group VIII noble metal(s) on a support wherein the support comprises a zeolite prepared by contacting a starting Y zeolite having a unit cell size of less than about 24.65 angstroms, a silica to alumina molar ratio greater than about 5, and an alkali metal content of less than about 0.3 percent (basis metal) with one or more aqueous solution(s) comprising alkali(ne-earth) metal ions under conditions sufficient to provide a final alkali(ne-earth) metal content (measured in terms of gram equivalent weight per gram of zeolite) of at least about 1.5 times greater than the alkali metal content (measured in terms of gram equivalent weight per gram of zeolite) of the starting zeolite.

2. The process of claim 1 wherein in the catalyst the starting Y zeolite has a unit cell size of less than about 24.4 angstroms, a silica to alumina molar ratio of greater than about 25 and an alkali metal content of less than about 0.15 percent.

3. The process of claim 2 wherein in the catalyst the Group VIII noble metal is selected from the group consisting of platinum, palladium and mixtures thereof and the amount of Group VIII metal ranges from about 0.05 to about 3 percent by weight of the total catalyst.

4. The process of claim 3 wherein in the catalyst the starting zeolite has a unit cell size of less than about 24.3 angstroms, a silica to alumina molar ratio of greater than about 35 and an alkali metal content of less than about 0.075 percent.

5. The process of claim 4 wherein in the catalyst the starting zeolite has a unit cell size of between about 24.2 and about 24.3 angstroms.

6. The process of claim 5 wherein in the catalyst the starting zeolite has a unit cell size of between about 24.22 and about 24.28 angstroms.

7. The process of claim 6 wherein in the catalyst the starting zeolite has a silica to alumina molar ratio or greater than about 50.

8. The process of claim 7 wherein in the catalyst the starting zeolite has a silica to alumina molar ratio or greater than about 60.

9. The process of claim 2 wherein in the catalyst the final alkali(ne-earth) metal content is at least 2 times greater than the alkali metal content of the starting zeolite.

10. The process of claim 9 wherein in the catalyst the final alkali(ne-earth) metal content is at least 5 times greater than the alkali metal content of the starting zeolite.

11. The process of claim 2 wherein in the catalyst the alkali metal and alkali(ne-earth) metal are both selected from the group consisting of sodium, potassium and mixtures and the final alkali(ne-earth) metal content ranges from about 0.1 to about 1.4 percent by weight, basis metal.

12. The process of claim 11 wherein the alkali metal is sodium.

13. The process of claim 2 wherein the catalyst additionally comprises a binder selected from the group consisting of alumina, silica, silica-alumina, magnesia, titania, zirconia, clays and mixtures thereof.

14. The process of claim 2 wherein the contact temperature ranges between about 200° C. and about 400° C.

15. The process of claim 2 wherein the contact temperature ranges between about 225° C. and about 375° C.

16. A process for the hydrogenation of hydrocarbon feedstocks containing hydrogenatable components and which have a boiling range between about 125° C. and about 625° C. which process comprises contacting said feedstock at a temperature ranging between about 150° C. and about 400° C. with hydrogen and a catalyst comprising platinum and palladium in an amount ranging from about 0.05 to about 3 percent by weight of the total catalyst and in a platinum to palladium molar ratio ranging from about 0.1 to about 1.0 supported on a support wherein the support comprises a zeolite prepared by contacting a starting Y zeolite having a unit cell size of less than about 24.4 angstroms, a silica to alumina molar ratio greater than about 25, and an alkali metal content of less than about 0.15 percent (basis metal) with one or more aqueous solution(s) comprising alkali(ne-earth) metal ions under conditions sufficient to provide a final alkali(ne-earth) metal content (measured in terms of gram equivalent weight per gram of zeolite) of at about 5 times greater than tile alkali metal content (measured in terms of gram equivalent weight per gram of zeolite) of the starting zeolite.

17. The process of claim 16 wherein the catalyst has been calcined at a temperature ranging from about 225° C. to about 850° C. prior to use in the process.

18. The process of claim 13 wherein the catalyst has further been activated at a temperature ranging from about 200° C. to about 500° C. in a hydrogen-containing atmosphere at a pressure greater than about 30 bar prior to use in the process.

19. A process for the hydrofining of a diesel range fuel feedstock containing aromatics and olefins to produce a product having a boiling range between about 125° C. and about 425° C. whereby said olefins and aromatics are substantially converted to saturates and the saturated aromatics are converted at least in part to acyclics with hydrocracking of the feedstock being substantially absent thereby improving the environmental quality and cetane number of the feedstock which process comprises contacting said feedstock at a temperature ranging between about 225° C. and about 375° C. with hydrogen and a catalyst comprising platinum and palladium in an amount ranging from about 0.05 to about 3 percent by weight of the total catalyst and in a platinum to palladium molar ratio ranging from about 0.1 to about 0.5 supported on a support wherein the support comprises a zeolite prepared by contacting a starting Y zeolite having a unit cell size of less than about 24.65 angstroms, a silica to alumina molar ratio greater than about 5, and an alkali metal content of less than about 0.3 percent (basis metal) with one or more aqueous solution(s) comprising alkali(ne-earth) metal ions under conditions sufficient to provide a final alkali(ne-earth) metal content (measured in terms of gram equivalent weight per gram of zeolite) of at least about 1.5 times greater than the alkali metal content (measured in terms of gram equivalent weight per gram of Y zeolite) of the starting zeolite.

20. The process of claim 15 wherein in the catalyst the starting Y zeolite has a unit cell size of less than about 24.4 angstroms, a silica to alumina molar ratio of greater than about 25 and an alkali metal content of less than about 0.15 percent.

21. The process of claim 20 wherein the catalyst has been calcined at a temperature ranging from about 225° C. to about 850° C. prior to use in the process.

22. The process of claim 21 wherein the catalyst has further been activated at a temperature ranging from about 200° C. to about 500° C. in a hydrogen-containing atmosphere at a pressure greater than about 30 bar prior to use in the process.

23. A process for the combined hydrotreating and hydrogenation of hydrocarbon feedstocks containing nitrogen- and sulfur-containing impurities, aromatics and olefins and which feedstocks have a boiling range between about 125° C. and about 625° C. which process comprises:
  (a) passing the feedstock to a-first stage wherein said feedstock is contacted with hydrogen and a hydrotreating catalyst comprising a Group VIII metal sulfide selected from nickel, cobalt and mixtures thereof and a Group VIB metal sulfide selected from molybdenum, tungsten and mixtures thereof supported on a support at a temperature ranging from about 200° C. to about 425° C.,
  (b) stripping gases from the product passing from the first stage to produce a liquid product,
  (c) passing said liquid product to a second stage wherein said liquid product is contacted with hydrogen and a hydrogenating catalyst comprising platinum and palladium in an amount ranging from about 0.05 to about 3 percent by weight of the total catalyst and in a platinum to palladium molar ratio ranging from about 0.1 to about 1.0 supported on a support wherein the support comprises a zeolite prepared by contacting a starting Y zeolite having a unit cell size of less than about 24.65 angstroms, a silica to alumina molar ratio greater than about 5, and an alkali metal content of less than about 0.3 percent (basis metal) with one or more aqueous solution(s) comprising alkali(ne-earth) metal ions under conditions sufficient to provide a final alkali(ne-earth) metal content (measured in terms of gram equivalent weight per gram of zeolite) of at least about 1.5 times greater than the alkali metal content (measured in terms of gram equivalent weight per gram of zeolite) of the starting zeolite, and (d) stripping gases from the product passing from the second stage to produce a final liquid product.

24. The process of claim 23 wherein in the catalyst used in step (c) the starting Y zeolite has a unit cell size of less than about 24.4 angstroms, a silica to alumina molar ratio of greater than about 25 and an alkali metal content of less than about 0.15 percent.

25. The process of claim 24 wherein the hydrogen partial pressure in both stages ranges from about 35 to about 100 bar.

26. The process of claim 25 wherein the hydrogen partial pressure in the second stage ranges from about 35 to about 70 bar.

27. A process for the hydrogenation of hydrocarbon feedstocks containing hydrogenatable components and which have a boiling range between about 125° C. and about 625° C. which process comprises contacting said feedstock at a temperature ranging between about 150° C. and about 400° C. with hydrogen and a catalyst comprising one or more Group VIII noble metal(s) in an amount ranging from about 0.05 to about 3 percent by weight of the total catalyst on a support wherein the support comprises a zeolite prepared by contacting a starting Y zeolite having a unit cell size of less than about 24.65 angstroms, a silica to alumina molar ratio greater than about 5, and an alkali metal content of less than about 0.3 percent (basis metal) with one or more aqueous solution(s) comprising alkali(ne-earth) metal ions under conditions sufficient to provide a final alkali(ne-earth) metal content (measured in terms of gram equivalent weight per gram of zeolite) of at least about 1.5 times greater than the alkali metal content (measured in terms of gram equivalent weight per grain of zeolite) of the starting zeolite.

* * * * *